US012624528B2

(12) United States Patent
Glöckner et al.

(10) Patent No.:  US 12,624,528 B2
(45) Date of Patent:  May 12, 2026

(54) METHOD FOR OPERATING A DRIVE TRAIN FOR A WORKING MACHINE, DRIVE TRAIN FOR A WORKING MACHINE, AND WORKING MACHINE

(71) Applicant: ZF Friedrichshafen AG, Friedrichshafen (DE)

(72) Inventors: Rico Glöckner, Pocking (DE); Migen Bebeti, Munich (DE); Jan Döring, Passau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 500 days.

(21) Appl. No.: 17/440,581

(22) PCT Filed: Mar. 17, 2020

(86) PCT No.: PCT/EP2020/057279
    § 371 (c)(1),
    (2) Date: Sep. 17, 2021

(87) PCT Pub. No.: WO2020/187906
    PCT Pub. Date: Sep. 24, 2020

(65) Prior Publication Data
    US 2022/0186468 A1      Jun. 16, 2022

(30) Foreign Application Priority Data
    Mar. 19, 2019    (DE) .......................... 102019203730.5

(51) Int. Cl.
    *E02F 9/20*          (2006.01)
    *B60L 15/32*         (2006.01)
    (Continued)

(52) U.S. Cl.
    CPC .............. *E02F 9/207* (2013.01); *B60L 15/32* (2013.01); *E02F 9/2079* (2013.01); (Continued)

(58) Field of Classification Search
    None
    See application file for complete search history.

(56) References Cited

U.S. PATENT DOCUMENTS 8,858,391 B2      10/2014  Tolkacz et al.
    2009/0325760 A1   12/2009  Soliman et al.
                      (Continued)

FOREIGN PATENT DOCUMENTS

DE      102007046735 A1      4/2009
    DE      102010015437 A1     11/2011
                      (Continued)

OTHER PUBLICATIONS

International Search Report and Written Opinion for PCT/EP2020/057279 mailed Jul. 15, 2020 (13 pages; with English translation).

*Primary Examiner* — Navid Z. Mehdizadeh
*Assistant Examiner* — Micah Chuen-Him Cheng
(74) *Attorney, Agent, or Firm* — Kristin L. Murphy

(57) ABSTRACT

The disclosure relates to a method for operating a drive train for a working machine, in which a working drive of the working machine is driven by a first electric motor via a first gear arrangement, a travel drive of the working machine is driven by a second electric motor via a second gear arrangement and, in a shifting procedure of the second gear arrangement, the rotational speed of the second electric motor is synchronised and the temperature of said second electric motor is recorded. In the disclosed method, the rotational speed is synchronised by supplying current to the second electric motor, and in the event of a threshold temperature being exceeded, at least one measure is carried out to relieve the thermal load of the second electric motor. The disclosure further relates to a corresponding drive train and to a working machine.

18 Claims, 2 Drawing Sheets

(51) Int. Cl.
    *F16H 61/04*         (2006.01)
    *F16H 61/688*       (2006.01)

(52) U.S. Cl.
    CPC ....... *F16H 61/0403* (2013.01); *F16H 61/688*
        (2013.01); *B60L 2240/425* (2013.01); *F16H*
        *2061/0422* (2013.01); *F16H 2061/0433*
        (2013.01)

(56)            References Cited

U.S. PATENT DOCUMENTS

| | | | |
|---|---|---|---|
| 2012/0083978 A1 | 4/2012 | Tajima et al. | |
| 2013/0214928 A1 | 8/2013 | Kuittinen et al. | |
| 2016/0068161 A1* | 3/2016 | Iketomi ................. | B60W 20/00 |
| | | | 180/65.265 |
| 2018/0222484 A1 | 8/2018 | Shively et al. | |
| 2020/0122572 A1* | 4/2020 | Kumar ..................... | B60K 1/02 |
| 2020/0149427 A1* | 5/2020 | Long ...................... | B64D 27/02 |

FOREIGN PATENT DOCUMENTS

| | | | |
|---|---|---|---|
| DE | 102010031156 A1 | 1/2012 | |
| DE | 102010063503 A1 | 6/2012 | |
| DE | 202014000738 U1 | 4/2014 | |
| DE | 102013007354 A1 | 10/2014 | |
| JP | 201874655 A | 5/2018 | |
| WO | 2020058111 A1 | 3/2020 | |

* cited by examiner

METHOD FOR OPERATING A DRIVE TRAIN FOR A WORKING MACHINE, DRIVE TRAIN FOR A WORKING MACHINE, AND WORKING MACHINE

CROSS-REFERENCE TO RELATED APPLICATION

This application is a national stage of International Application No. PCT/EP2020/057279, filed Mar. 17, 2020, the disclosure of which is incorporated herein by reference in its entirety, and which claimed priority to German Patent Application No. 102019203730.5, filed Mar. 19, 2019, the disclosure of which is incorporated herein by reference in its entirety.

TECHNICAL FIELD

The present disclosure relates to a method for operating a drive train for a working machine, to a drive train for a working machine, and to a corresponding working machine.

BACKGROUND

Electrically driven working machines, such as, for example, wheel loaders, compact loaders, telescopic handlers, dumpers or excavators, are known in the prior art. Such electrically driven working machines are either driven purely electrically, that is to say they have only an electric battery or an electric accumulator for their energy supply, or they are driven diesel-electrically, which means that the required energy is provided by a diesel-driven generator, usually in conjunction with an electric buffer store, such as, for example, a correspondingly dimensioned capacitor. In all cases, the mechanical power required for the traction drive and the working drive is generated by one or more electric motors. Furthermore, hybrid-electric working machines are also known, in which the required mechanical power is generated primarily by a combustion engine, usually a diesel engine. An electric motor which is additionally provided here typically performs a so-called boost function.

Power-shiftable transmissions for working machines are likewise known, in which, during a shifting operation, a speed synchronization between the speed of the drive unit and the speed of the gear stage to be engaged is carried out. In the case of an upshift operation, the speed of the drive unit is correspondingly reduced, and in the case of a downshift operation it is correspondingly increased. The synchronization of the speed thereby takes place via friction work between the clutch elements.

In this context DE 20 2014 000 738 U1 describes a wheel loader which is driven purely electromotively, which has a first electric motor for a traction drive and a second electric motor for a working drive.

From DE 10 2010 063 503 A1 there is further known a multistage transmission of the planetary type of a working machine. The multistage transmission comprises a housing, in which four planetary gear sets and a plurality of shafts are received, and shifting elements which are formed by at least one brake and clutches and by a targeted actuation of which eight different transmission ratios between a drive shaft and an output shaft can be described. The transmission of DE 10 2010 063 503 A1 permits power-shiftability.

From DE 10 2007 046 735 A1 there is known a method for preventing overloading of a starting clutch during a starting operation in a higher gear of an automated manual transmission. In the event of actual or possible overheating of the starting clutch, an emergency downshift is carried out.

The known electrically driven working machines are, however, disadvantageous in that a speed synchronization of the gear stages involved in a shifting operation under power is more difficult compared to an identical operation in a working machine driven by a combustion engine. The reason for this is on the one hand the comparatively greater moment of inertia of an electric motor compared to a combustion engine, but primarily the significantly greater speed spectrum of the electric motor, as a result of which there may be correspondingly greater speed differences, which must correspondingly be synchronized. In the case of repeated shifting, in particular at short time intervals, this can also lead to high thermal loading of the electric motor.

Accordingly, an improved method for operating a drive train for a working machine is needed.

SUMMARY

The disclosure herein provides for a method for operating a drive train for a working machine.

The disclosure relates to a method for operating a drive train for a working machine, wherein a working drive of the working machine is driven by a first electric motor via a first transmission arrangement, wherein a traction drive of the working machine is driven by a second electric motor via a second transmission arrangement, wherein during a shifting operation of the second transmission arrangement a speed synchronization of the second electric motor is carried out, and wherein a temperature of the second electric motor is detected. The method according to the disclosure is distinguished by the fact that the speed synchronization is carried out by energization of the second electric motor and that, if a limit temperature is exceeded, at least one measure for relieving the thermal load of the second electric motor is carried out.

The method according to the disclosure thus provides the operation of a drive train for a working machine by two electric motors, namely by the first electric motor and the second electric motor. The first electric motor is associated in a dedicated manner with the working drive, and the second electric motor with the traction drive. During a shifting operation in the second transmission arrangement, that is to say the traction transmission, a speed synchronization of the elements involved in the shifting operation, including the second electric motor, must in each case be carried out. In the prior art, the speed synchronization is conventionally carried out by friction work in a clutch involved in the shifting operation, which results in wear of the clutch, however, and therefore requires a correspondingly loadable clutch design. According to the disclosure, the speed synchronization during a shifting operation of the second transmission arrangement is therefore carried out via the second electric motor itself, namely by corresponding energization of the second electric motor. Depending the direction of current flow, the energization leads to the generation of a corresponding torque and thus either to an increase in the speed of the second electric motor or to a reduction in the speed of the second electric motor. The speed difference thus does not have to be eliminated by friction work in the clutch involved in the particular shifting operation. The clutch can accordingly be designed so as to be more compact and less powerful, which results in cost and weight savings. However, depending on the speed change of the second electric motor that is necessary for the speed synchronization, energization with comparatively high currents may be necessary in order to generate the torque necessary for the rapid torque change. However, high currents lead to corresponding, generally undesirable heating of the second electric motor, and for this reason the temperature thereof is advantageously detected at specific time intervals. In one exemplary arrangement, the temperature is detected continuously. If it is then determined that a previously fixed limit temperature has been exceeded, at least one measure for relieving the thermal load of the second electric motor is carried out, so that the second electric motor can cool down or at least is not heated further. This prevents damage to the second electric motor and prolongs its working life.

Within the meaning of the disclosure, energization is understood as meaning not only the external supply of current to an electric motor in order to allow it to generate a torque, but additionally also the transfer of the electric motor into a generator mode, so that the speed reduction required for the speed synchronization results from the electromagnetic braking force experienced by the rotor of the second electric motor as a result of the generator mode. Energization of the electric motor also occurs as a result, but in this case the current is not supplied externally but is generated within the electric motor. In both cases, however, current is applied to the coil windings of the electric motor, that is to say they are energized. Accordingly, energization of the second electric motor is understood as meaning both external energization and transfer into the generator mode.

During a shifting operation from a lower gear stage into a higher gear stage, the second electric motor, which is associated with the traction drive, must reduce its speed very quickly in order to establish the necessary speed synchronization. Conversely, during a shifting operation from a higher gear stage into a lower gear stage, the second electric motor must increase its speed very quickly in order to achieve the speed synchronization.

In one exemplary arrangement, the temperature of the second electric motor is detected via a sensor configured for this purpose, for example a sensor which operates by the Seebeck effect or an infrared sensor. Alternatively, the temperature of the second electric motor can, however, also be detected computationally by a temperature model of the second electric motor.

In one exemplary arrangement, the first transmission arrangement, that is to say the working transmission, is also designed so as to be shiftable. In this case, the method according to the disclosure is implemented also for the first electric motor.

It is further also conceivable to provide not only a single first or second electric motor but a plurality of first or second electric motors, which can be coupled with one another, for example, via a summation gear or can be separably connected in terms of drive to the first or second transmission arrangement.

In one exemplary arrangement, at least the second transmission arrangement has a plurality of gear stages in the form of forward gears and at least one gear stage in the form of a reverse gear. In one exemplary arrangement, the number of forward gears corresponds to the number of reverse gears. The first transmission arrangement can also have more than only one gear stage in the form of a forward gear. In addition, one or more gear stages of the first transmission arrangement that are in the form of a reverse gear are also conceivable. Owing to the ability of electric motors to change their direction of rotation, the provision of reverse gears is, however, not always required.

According to another exemplary arrangement, the second transmission arrangement is in the form of an automated manual transmission, the at least one measure is the application of a shift hysteresis to a shifting point of the second transmission arrangement. In an automated manual transmission, a shifting point represents an operating point at which a shifting operation—usually into the next higher or next lower gear stage—takes place. The shifting point can be affected, for example, by a motor load, by a motor speed, by speeds of the transmission elements which are associated with the engaged gear stage, by a speed of the working machine, by a detected coasting or traction mode of the working machine, or also by a detected incline of the ground. By applying a hysteresis to the shifting point, this one shifting point is split into two different, direction-dependent shifting points, wherein one of the two shifting points is used exclusively in the case of a downshift operation and the other of the two shifting points is used exclusively in the case of an upshift operation. The directionality is such that an operating point that initiates the shifting operation is not reached until later. For example, a shift hysteresis can be applied to a shifting point specified in a speed-dependent manner, which is usually 10 km/h, so that it splits into a shifting point at 8 km/h and a shifting point at 12 km/h. In order that the initiation of the shifting operation is delayed, that is to say an operating point that initiates the shifting operation is not reached until later, the shifting point at 8 km/h is used exclusively for a downshift operation and the shifting point at 12 km/h is used exclusively for an upshift operation. Thus, a downshift does not take place until later when the working machine slows down, and an upshift does not take place until later when the working machine accelerates. It is thereby possible, in the case of frequent speed changes around the original shifting point, to reduce the number of shifting operations. Together with the number of shifting operations, the frequency of the speed synchronizations that are carried out, and thus the thermal load of the second electric motor, is also reduced.

In one exemplary arrangement, a shift hysteresis is applied not only to one shifting point of the second transmission arrangement but to a plurality of shifting points or to all the shifting points.

Such a shift hysteresis can also be applied to one or more shifting points of the first transmission arrangement.

According to a further exemplary arrangement of the disclosure it is provided that the at least one measure is assistance with the speed synchronization by a clutch. This means that the speed synchronization is carried out not solely by energization of the second electric motor but is additionally assisted by a friction process of the respective clutch of the second transmission arrangement. The thermal load of the second electric motor is thereby correspondingly also reduced.

In one exemplary arrangement, the at least one measure can also be a speed synchronization solely by the corresponding clutch of the second transmission arrangement. In this case, the second electric motor is thus not used for the speed synchronization at all. The relief of the thermal load of the second electric motor is correspondingly great.

In one exemplary arrangement, the thermal load of the first electric motor is also relieved in that the speed synchronization is assisted or performed wholly by a clutch of the first transmission arrangement.

According to a further exemplary arrangement of the disclosure it is provided that the at least one measure is an intensification of cooling of the second electric motor. For example, a feed pump of a cooling circuit which cools the second electric motor can be operated with a higher capacity, or additional cooling devices, for example radiators, for cooling a cooling fluid can be activated.

In one exemplary arrangement, it is also provided not only to intensify the cooling of the second electric motor but additionally or alternatively also to intensify the cooling of a clutch of the second transmission arrangement that is involved in the shifting operation. As a result, the clutch can in turn contribute more greatly to relieving the thermal load of the second electric motor by contributing more greatly to the necessary speed synchronization by additional friction work.

In one exemplary arrangement, the first electric motor is also relieved by intensification of the cooling thereof or of the cooling of a clutch of the first transmission arrangement.

According to a further exemplary arrangement of the disclosure, it is provided that the at least one measure is establishment of a drive connection between the working drive and the traction drive, so that the traction drive is driven additionally or exclusively by the first electric motor. This means that the first electric motor, which is actually associated with the working drive and provided for the working drive, can additionally also drive the traction drive via a driving short circuit between the working drive and the traction drive. This in turn advantageously makes it possible to reduce the energization and thus the thermal load of the second electric motor to the same extent as the first electric motor contributes to the traction drive.

According to one exemplary arrangement of the disclosure it is provided that driving of the traction drive by the first electric motor is carried out while taking account of a temperature of the first electric motor. This has the advantage that the relief of the thermal load of the second electric motor cannot lead to thermal overloading of the first electric motor. Instead, the first electric motor contributes to the traction drive no more than its own thermal reserves allow. Damage or overloading of the first electric motor can thus be avoided.

More specifically, in one exemplary arrangement, it is provided that the first electric motor drives the traction drive and the working drive simultaneously. This arrangement has the advantage that the working drive is also driven and is available continuously. Only the power requirement required by the traction drive is then additionally provided by the first electric motor.

In one exemplary arrangement, it is provided that the traction drive is driven by the first electric motor only if a power required by the working drive can still be provided thereto by the first electric motor. The traction drive is thus driven by the first electric motor only when, or only inasmuch as, the power required by the working drive can continue to be supplied to the working drive. This has the advantage that it is ensured in every case that the working drive at all times receives the power required and demanded by an operator of the working machine, so that a sudden power drop of the working drive, in particular a power drop that is unexpected for the operator, can be avoided. It is important that the power requirement of the working drive is met fully by the first electric motor in particular in situations where comparatively high power requirements are made by both the traction drive and the working drive which, however, cannot be met in total by the first electric motor.

In one exemplary arrangement, it is provided that, via the drive connection, the working drive can also be driven additionally or exclusively by the second electric motor.

According to a further exemplary arrangement of the disclosure it is provided that the at least one measure is a limitation of a permissible operating range of the second electric motor. This means that the permissible operating range is limited, in particular to a comparatively low power range. The power range can be specified, for example, by limiting operating voltages or operating currents to in each case a specific maximum limit power. As a result, energization with comparatively high currents can be avoided, whereby the thermal load of the second electric motor is reduced and the second electric motor is able to cool down.

In one exemplary arrangement, the permissible operating range can be limited not only by limiting operating voltages or operating currents but additionally or alternatively by limiting a motor speed to a specific limit speed.

The limitation to a specific operating range, or the specifiable limit power or limit speed, can advantageously be chosen in dependence on the temperature of the second electric motor detected in a particular case. For example, if the limit temperature is exceeded only slightly, this can initially result in only a slight limitation of the permissible operating range, for example to a maximum of 75% of the maximum power of the second electric motor. If the limit temperature is exceeded significantly, however, this can result in an immediate and very severe limitation of the operating range, for example to a maximum of 50% of the maximum power.

In one exemplary arrangement, it is provided that a permissible operating range of the first electric motor can also be limited in order to relieve the thermal load of the first electric motor.

According to a further exemplary arrangement of the disclosure it is provided that the at least one measure is an upshift prevention in the second transmission arrangement. That is to say, a selected gear stage of the second transmission arrangement cannot be increased further in order to relieve the thermal load of the second electric motor. In one exemplary arrangement, the upshift prevention is in the form of a blocking of the corresponding shifting operation, which is possible in an automated manual transmission, for example, simply and effectively via correspondingly configured control software. Because the gear stage can no longer be upshifted by an upshift operation, a maximum travelling speed of the working machine is limited. Moreover, since the power requirement in lower gear stages is generally lower than in higher gear stages, a thermal load of the second electric motor can thereby be reduced. Moreover, the upshift prevention avoids a corresponding shifting operation and, associated therewith, also a necessary speed synchronization, which likewise contributes towards relieving the thermal load of the second electric motor.

In one exemplary arrangement, it is provided that upshift prevention is also provided in the first transmission arrangement for relieving the thermal load of the first electric motor.

A downshift of the engaged gear stage of the second transmission arrangement, on the other hand, can continue to be permitted. Although this initially requires a speed synchronization, it then leads to a comparatively lower power requirement of the second electric motor and thus to relief of the thermal load of the second electric motor.

The disclosure relates further to a drive train for a working machine, wherein the drive train comprises a working drive having a first transmission arrangement and having a first electric motor, and a traction drive having a second transmission arrangement and having a second electric motor, wherein the working drive can be driven by the first electric motor via the first transmission arrangement and wherein the traction drive can be driven by the second electric motor via the second transmission arrangement. The drive train according to the disclosure is distinguished by the fact that a drive connection can be established between the working drive and the traction drive via a connecting clutch. The drive train according to the disclosure accordingly advantageously comprises the necessary devices to be able to implement the method according to the disclosure. This in turn results in the advantages already described in connection with the method according to the disclosure.

In one exemplary arrangement, the drive train further comprises, for controlling or regulating the speed or torque of or the power to be provided by the first electric motor and the second electric motor, in each case an own power electronics or a single common power electronics.

In one exemplary arrangement, the drive train comprises an electronic control device which controls or regulates the first electric motor and the second electric motor via the respective own power electronics or via the common power electronics. The control device can additionally also control the first transmission unit and/or the second transmission unit. The control device for its part advantageously comprises a microprocessor and an electronic memory in which the method according to the disclosure is stored in the form of a software algorithm which can be executed by the microprocessor.

In one exemplary arrangement, the drive train also comprises at least one cooling device for cooling the first electric motor, the second electric motor, the first transmission unit and/or the second transmission unit.

In one exemplary arrangement, the second transmission arrangement is power-shiftable over a plurality of gear stages.

The first transmission arrangement is of comparably simple form as a reduction stage. If the first transmission arrangement comprises a plurality of shiftable gear stages, the gear stages are power-shiftable.

According to one exemplary arrangement of the disclosure, it is provided that the first electric motor and the second electric motor are arranged in a common housing. This allows the first electric motor and the second electric motor to be arranged in a space- and weight-saving manner within the drive train in a working machine. Moreover, the common housing saves weight and costs compared to two individual housings. The first and the second electric motor can be installed in a common housing, for example, axially one behind the other, wherein the motor output shafts, for example, can point out of the housing in opposite axial directions. However, an arrangement axially side by side in a correspondingly configured housing is likewise possible and preferred, so that the two output shafts can point, for example, in the same axial direction.

According to a further exemplary arrangement of the disclosure, it is provided that the drive train is configured to implement the method according to the disclosure.

In one exemplary arrangement, the first electric motor and/or the second electric motor are further configured to recover kinetic energy in a braking operation of the drive train. By the drive connection, which can be established according to the disclosure between the first traction drive and the working drive via the first clutch, kinetic energy can advantageously be recovered both by the second electric motor and by the first electric motor. For this purpose, in one exemplary arrangement, the drive train further comprises an electrical energy store to which the electrical energy supplied by the recovery operation can be supplied. In a recovery operation, the first electric motor and/or the second electric motor work as generators and convert kinetic energy of the working machine into electrical energy. This electrical energy can later be drawn from the electrical energy store again if required, in order to supply the first electric motor and/or the second electric motor. In addition, it can also be provided that the electrical energy store can be charged with external electrical energy via a charging cable or other suitable charging device, for example an inductive charging device. The use of the first electric motor and/or the second electric motor for recovery additionally reduces the wear of a mechanical friction brake.

The disclosure relates further to a working machine comprising a drive train according to the disclosure. The advantages already described in connection with the drive train according to the disclosure are also obtained for the working machine according to the disclosure.

According to one exemplary arrangement of the disclosure it is provided that the working machine is in the form of one of a wheel loader, dumper, excavator, telescopic handler or tractor.

BRIEF DESCRIPTION OF THE DRAWINGS

The disclosure will be explained by way of example hereinbelow with reference to exemplary arrangements shown in the figures, in which.

DETAILED DESCRIPTION

Figure 2:
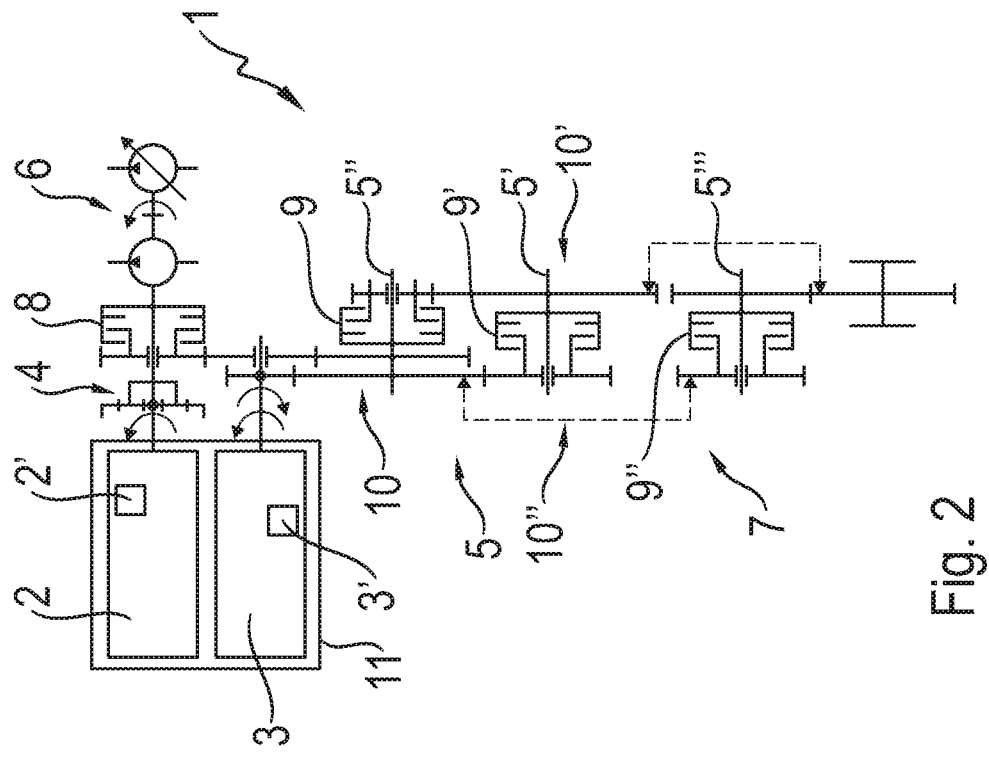
FIG. 2 shows, by way of example, a further possible exemplary arrangement of a drive train according to the disclosure for a working machine in the form of a wheel diagram.

Identical objects, functional units and comparable components are designated with the same reference numerals throughout the figures. These objects, functional units and comparable components are identical in form in terms of their technical features, unless explicitly or implicitly apparent otherwise from the description.

Figure 1:
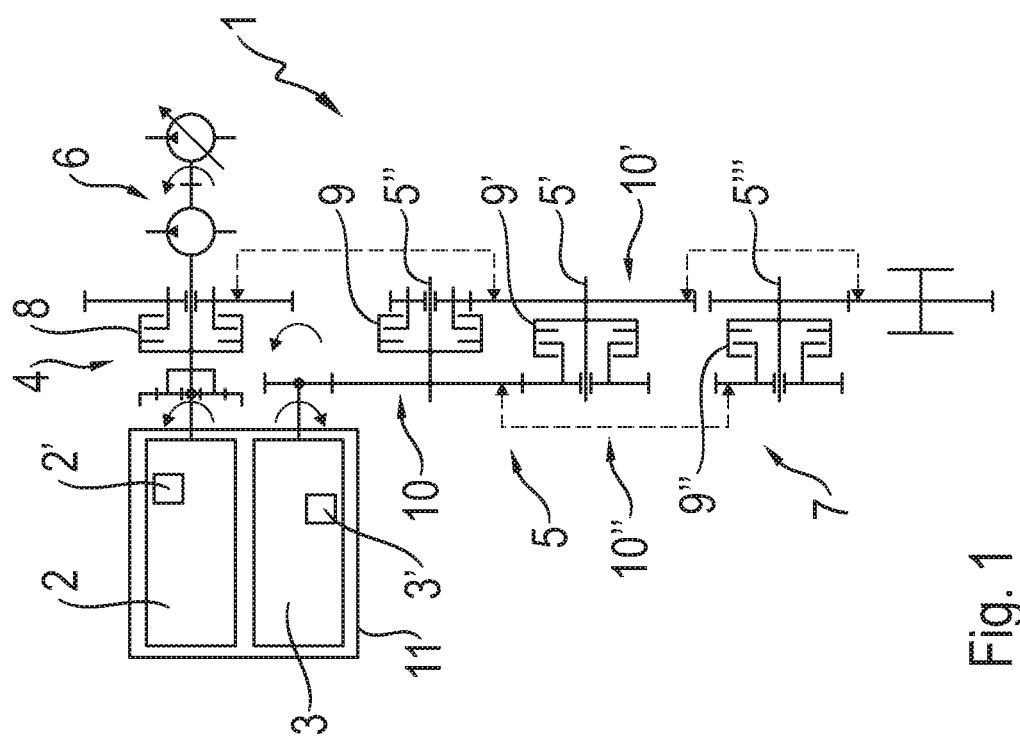
FIG. 1 shows, by way of example, a possible exemplary arrangement of a drive train according to the disclosure for a working machine in the form of a wheel diagram.

FIG. 1 shows, by way of example, a possible exemplary arrangement of a drive train 1 according to the disclosure for a working machine, not shown in FIG. 1, in the form of a wheel diagram. According to the example, the drive train 1 of FIG. 1 comprises a first electric motor 2 and a second electric motor 3, which are arranged in a common housing 11. Both the first electric motor 2 and the second electric motor 3 each have an associated temperature sensor 2', 3' for continuously detecting a temperature of the first or second electric motor 2, 3.

The drive train 1 of FIG. 1 further comprises a first transmission arrangement 4 and a second transmission arrangement 5, wherein the first electric motor 2 and the first transmission arrangement 4 are associated with a working drive 6 of the drive train 1. The second electric motor 3 and the second transmission arrangement 5, on the other hand, are associated with a traction drive 7 of the drive train 1. The second transmission arrangement 5 further comprises according to the example three further, power-shiftable clutches 9, 9' and 9" and three shafts 5, 5' and 5" in order to provide, via three different spur gear stages 10, 10', 10", three shiftable gear stages of the second transmission arrangement 5.

During a shifting operation of the second transmission arrangement 5, a previously closed clutch 9, 9' or 9" is opened and at the same time a previously open clutch 9, 9' or 9" is closed. In order that a clutch 9, 9' or 9" is able to close, a speed synchronization of the elements of the gear stage to be shifted must first be carried out.

According to the example, the speed synchronization is carried out by corresponding energization of the second electric motor 3, which, however, owing to the necessary rapid speed change and the associated high current strengths, also leads to pronounced heat generation in the second electric motor 3. In order to relieve the thermal load of the second electric motor 3, a drive connection can be established between the first transmission arrangement 4 and the second transmission arrangement 5 via a connecting clutch 8, wherein the drive connection can be established according to the example from the first electric motor 2 to the shaft 5' of the second transmission arrangement 5. The first electric motor 2 is thus able to drive the traction drive 7 when the connecting clutch 8 is closed. According to the example, this occurs whenever the thermal load of the second electric motor 3 has to be relieved. By driving the traction drive 7 additionally by the first electric motor 2, the second electric motor 3 can be operated at a lower operating point, whereby energization of the second electric motor 3 is reduced and thus a thermal load of the second electric motor 3 is also reduced.

FIG. 2 shows, by way of example, a further possible exemplary arrangement of a drive train 1 according to the disclosure for a working machine, not shown in FIG. 2, in the form of a wheel diagram. The drive train 1 of FIG. 2 differs from the drive train 1 only by the drive connection which can be established from the first electric motor 2 to the traction drive 7. According to the example, this drive connection runs from the first electric motor 2 to the shaft 5" of the second transmission arrangement 5.

Figure 3:
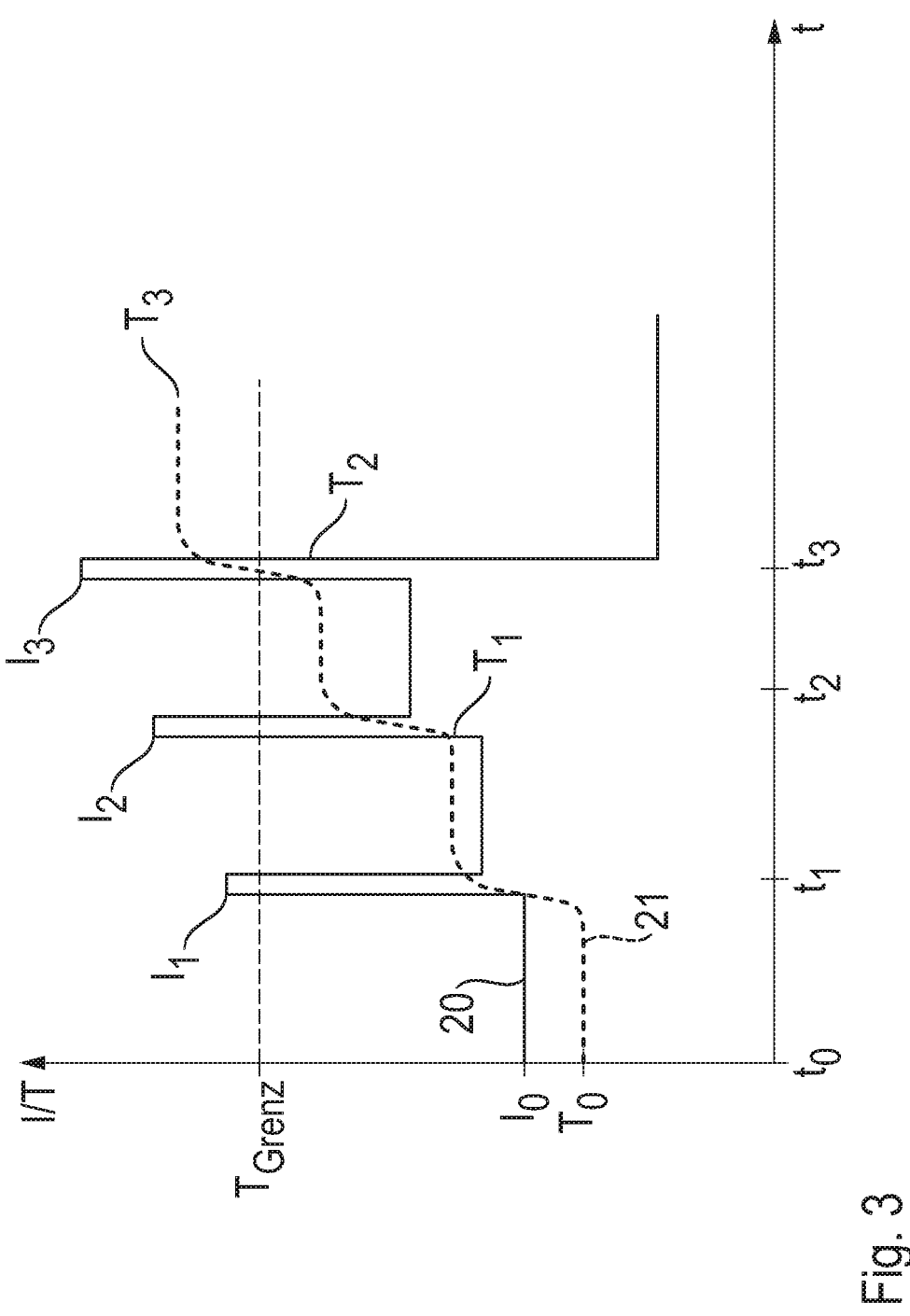
FIG. 3 shows, by way of example, a curve of an energization of the second electric motor and an associated curve of a temperature of the second electric motor over time.

FIG. 3 shows, by way of example, a curve 20 of an energization (represented on the y-axis) of the second electric motor 3 and an associated curve 21 of a temperature (likewise represented on the y-axis) of the second electric motor 3 over time t (represented on the x-axis). At time $t_0$, the second electric motor 3 is operated with current $I_0$ and has temperature $T_0$. Although the current $I_0$ leads to constant heating of the second electric motor 3, the heat that develops is dissipated via a cooling system so that there is a dynamic thermal equilibrium. At time $t_1$, a shifting operation takes place in the second transmission arrangement 5, and for this reason a speed synchronization is required. The speed synchronization is carried out by energization of the second electric motor 3 with current $I_1$ for a short time. This also effects an abrupt rise in the temperature to value $T_1$. The working machine then continues its journey uniformly until time $t_2$, wherein at time $t_2$ a shifting operation again takes place in the second transmission arrangement 5.

The speed synchronization which is again required and the high energization $I_2$ of the second electric motor 3 required therefor results in a further rise in the temperature, this time to value $T_2$. Temperature $T_2$ is only just below the limit temperature $T_{limit}$. At time $t_3$, a further shifting operation takes place, which again leads to a short-time rise in the energization to current strength $I_3$ and to a rise in the temperature to value $T_3$. The temperature $T_3$ of the second electric motor now also exceeds the limit temperature $T_{limit}$. This has the result that, when the limit temperature $T_{limit}$ is exceeded, a number of measures for relieving the thermal load of the second electric motor 3 are carried out.

According to the example, a shift hysteresis is first applied to all the shifting points of the second transmission arrangement 5, in order to avoid or at least delay further shifting operations. Cooling of the second electric motor 3 is also intensified. Finally, a drive connection is established between the working drive 6 and the traction drive 7 so that the traction drive 7 is additionally driven by the first electric motor 2. As a consequence of the last-mentioned measure for relieving the thermal load of the second electric motor 3, the energization thereof can be reduced to value $I_4$. The temperature of the second electric motor 3 thereupon reduces rapidly.

The invention claimed is:

1. A method for operating a drive train for a working machine, wherein a working drive of the working machine is driven by a first electric motor via a first transmission arrangement, wherein a traction drive of the working machine is driven by a second electric motor via a second transmission arrangement, wherein, during a shifting operation of the second transmission arrangement, a speed synchronization of the second electric motor is carried out, and wherein a temperature of the second electric motor is detected, wherein the speed synchronization is carried out by energization of the second electric motor, and in that, if a limit temperature is exceeded, at least one active measure during the shift operation to relieve the the thermal load of the second electric motor, the measure comprising at least one of clutch-assisted synchronization, intensification of cooling, application of shift hysteresis, or drive reconfiguration to reduce load on the second electric motor.

2. The method as claimed in claim 1, wherein the second transmission arrangement is in the form of an automated manual transmission, the at least one measure is the application of a shift hysteresis to a shifting point of the second transmission arrangement.

3. The method of claim 2, further comprising intensifying a cooling of the second electric motor.

4. The method as claimed in claim 1 wherein the at least one measure is assistance of the speed synchronization by a clutch.

5. The method as claimed in claim 1 wherein the at least one measure is an intensification of a cooling of the second electric motor.

6. The method as claimed in claim 1, wherein the at least one measure is an establishment of a drive connection between the working drive and the traction drive, so that the traction drive is additionally or exclusively driven by the first electric motor.

7. The method as claimed in claim 6, wherein driving of the traction drive by the first electric motor is carried out while taking account of a temperature of the first electric motor.

8. The method as claimed in claim 1, wherein the at least one measure is a limitation of a permissible operating range of the second electric motor.

9. The method as claimed in claim 1, wherein the at least one measure is an upshift prevention in the second transmission arrangement.

10. The method as claimed in claim 1 wherein the at least one measure includes the—assistance of the speed synchronization by a clutch and an intensification of a cooling of the second electric motor.

11. The method as claimed in claim 1, wherein the at least one measure includes the assistance of the speed synchronization by a clutch and establishment of a drive connection between the working drive and the traction drive, so that the traction drive is additionally or exclusively driven by the first electric motor.

12. The method as claimed in claim 1, wherein the at least one measure includes the assistance of the speed synchronization by a clutch and a limitation of a permissible operating range of the second electric motor.

13. The method as claimed in claim 1, wherein the at least one measure includes the assistance of the speed synchronization by a clutch and an upshift prevention in the second transmission arrangement.

14. The method of claim 1, wherein during the shifting operation of the second transmission arrangement, a previously closed clutch is opened and at the same time a previously open clutch is closed, wherein the clutch switching is coordinated with the execution of a thermal relief measure when the temperature of the second electric motor exceeds a threshold.

15. A drive train for a working machine, wherein the drive train comprises:

a working drive having a first transmission arrangement and having a first electric motor, a traction drive including a second transmission arrangement and a second electric motor, a connecting clutch configured to selectively establish a drive connection between the working drive and the traction drive, a first temperature sensor associated with the first transmission arrangement and a second temperature sensor associated with the second transmission; wherein the first and second temperature sensors are each configured to continuously detect a temperature of the respective first and second electric motors; and wherein, upon detection that the temperature of the second electric motor exceeds a predefined threshold, the connecting clutch is configured to be engaged to enable the first electric motor to drive the traction drive, thereby relieving thermal load on the second electric motor.

16. The drive train as claimed in claim 15, wherein the first electric motor and the second electric motor are arranged in a common housing.

17. A working machine comprising the drive train as claimed in claim 15.

18. The drive train of claim 15, wherein the second transmission arrangement further comprises three power-shiftable clutches and three shaft to provide three different spur gear stages.

\* \* \* \* \*